United States Patent [19]

Stahl

[11] 3,770,558
[45] Nov. 6, 1973

[54] TUFTED CARPET
[75] Inventor: Roland E. Stahl, Wilmington, Del.
[73] Assignee: E. I. du Pont de Nemours and Company, Wilmington, Del.
[22] Filed: Mar. 4, 1971
[21] Appl. No.: 121,209

Related U.S. Application Data
[60] Division of Ser. No. 789,605, Jan. 7, 1969, Pat. No. 3,583,936, which is a continuation-in-part of Ser. No. 656,683, July 28, 1967, abandoned.

[52] U.S. Cl.......................... 161/65, 156/72, 161/67
[51] Int. Cl............................................. D05c 17/02
[58] Field of Search...................................... 156/72; 161/62–67

[56] References Cited
UNITED STATES PATENTS
3,537,946  11/1970  Truax et al. .......................... 161/67

Primary Examiner—William A. Powell
Attorney—Thomas E. Currier et al.

[57] ABSTRACT

This invention relates to an adhesive composition useful for backsizing tufted carpets. The composition contains a copolymer of ethylene, a wax, and a particular resin extender blend and can be applied as a hot melt to the backside of a carpet. The composition has excellent adhesion characteristics as well as toughness, high softening point, and a suitable viscosity at coating application temperatures. Fillers can also be included in the composition as well as other ingredients.

3 Claims, No Drawings

TUFTED CARPET

RELATION TO OTHER APPLICATIONS

This is a division of application Ser. No. 789,605, filed Jan. 7, 1969, now U. S. Pat. No. 3,583,936, issued June 8, 1971, which application is a continuation-in-part of application Serial No. 656,683, filed July 28, 1967, now abandoned.

BACKGROUND OF THE INVENTION

In preparing carpets for floor covering and similar uses it has been the practice to apply adhesives as backsizes in the form of a latex. The wet latex is spread onto the backside of the carpet and is then dried or cured by heating. The use of a latex is both time consuming and requires careful control in order to prevent damage to the tufted structure. On the other hand, the use of hot melt polymeric adhesives is also frequently accompanied by disadvantages. Such disadvantages are usually found in one or more of the following characteristics: insufficient strength properties involving both the toughness of the adhesive itself and its adhesive strength in bonding to other carpet materials, improper melt viscosity at the temperatures at which application to the carpet is to be accomplished, poor hand of the finished carpet, and a low adhesive softening point.

The toughness of an adhesive composition is defined as the product of its tensile strength at yield (lbs./in.$^2$) and its percent elongation at break. These properties are measured on a cast film of the composition using an Instron tester. A toughness of at least 11,000 is usually considered acceptable. Aside from toughness, the other strength property of a backsizing composition is its adhesive strength. This property is generally indicated by the carpet's pill or fuzz resistance and secondary backing bond. Pill resistance is measured by tumbling carpet samples in the presence of an abrading material for ten hours and subsequently visually rating the development of pilling using a rating scale of 1 to 5. A value of 4 or better is considered acceptable. The secondary backing bond is meaningful when an additional backing material is applied to the tufted carpet after the adhesive application. This bond is measured by basic peel test techniques on 3 inch wide strips. A value of 10 lbs./3 in. is considered the minimum acceptable value.

Except for very heat sensitive fibers, the adhesive application to the carpet is generally accomplished at a temperature of about 220°F.-340°F. Consequently, viscosity measurements are made over this temperature range and a desirable adhesive composition should have a Brookfield viscosity (spindle No. 7; 50 r.p.m.) of about 1,000 centipoises–15,000 centipoises within the aforementioned temperature range. When using compositions with appreciably higher viscosities, difficulty is encountered in getting adhesive penetration into the fibers. At lower viscosities excessive penetration is observed and, if a secondary backing material is to be applied, it is difficult to achieve proper adhesion.

For commercial acceptance a finished carpet must have a suitable feel which is customarily referred to as carpet "hand." Good carpet hand is associated with a feeling of stiffness or body. The rigidity of the adhesive composition, as reflected by the elastic modulus, influences the carpet's hand; particularly when the adhesive composition does not contain filler and low coating weights are used. In such instances, compositions with an elastic modulus of 5,000–20,000 psi, preferably 8,000–17,000 psi, are suitable. As higher coating weights or filled compositions are employed, the modulus of the composition diminishes in significance with respect to influencing carpet hand.

The adhesive composition's softening point is related to the temperature at which the adhesive bond in the backsized carpet fails. This temperature is indicated by the ring and ball softening point (ASTM E-28-58T) of the adhesive composition which should be at least 190°F. A carpet backsized with such adhesives can withstand commercial cleaning techniques and can be used on floors subjected to high temperatures such as those wherein radiant heating is employed. Furthermore, such carpets can also be stored and shipped under conditions of elevated temperature.

SUMMARY OF THE INVENTION

According to the present invention there is provided an adhesive composition with optimum viscosity and softening characteristics which can be applied as a hot melt to the backside of a tufted carpet to yield a carpet displaying good strength and desirable hand. The present adhesive composition comprises (1) about 10–35 weight percent of an ethylene copolymer containing about 60–85 weight percent ethylene units and about 40–15 weight percent lower vinyl ester, acrylate, or methacrylate units; (2) about 10–25 weight percent of a wax component having a high melting point; and (3) about 50–70 weight percent of a particular resin extender blend of a base resin and a modifying resin in a limited ratio range. While the above-recited weight percentages are based on the combined weight of the three named essential ingredients, the adhesive composition can contain up to about 45 weight percent inert filler material, based on the total composition (three essential ingredients plus filler). In application, the present adhesive in a molten state is distributed uniformly across the backside of a tufted carpet which has carpet yarn stitched to a backing material and, thereafter, the adhesive is solidified by cooling. Also, the present adhesive is particularly suitable when it is desirable to apply a secondary backing material to the carpet. The secondary backing material can be applied almost immediately after the adhesive application to the carpet backside; there being no necessity for an intermediate cooling or drying step. Of course, the present adhesive can be used in preparing carpet containing no secondary backing material.

DESCRIPTION OF THE PREFERRED EMBODIMENTS

The manner in which the carpet is prepared prior to the adhesive application of the present invention is not particularly limited. The art of preparing tufted carpets is well known and generally comprises stitching a primary backing material with yarn in such a manner as to form on the top surface of the material a pile composed of numerous closely spaced erect loops of yarn. The yarn at the base of each loop extends through the primary backing and is visible on the bottom surface of the resulting loop-stitched or "tufted" structure. The adhesive composition of the present invention is applied to the bottom surface of the tufted structure and, consequently, the bottom of the primary backing material and the base portion of the loops of pile yarn are coated with the adhesive composition.

As with the method of preparing the tufted carpet prior to the adhesive application of the present invention, any of a wide variety of known yarns and backing materials, including both synthetic and natural materials, can be used in the present invention. For a detailed description of methods and materials useful in making tufted carpets, prior to the particular adhesive application of the present invention, reference is made to Seymour Sands' United States Pat. No. 3,390,035.

Similarly, any method known in the art of applying coatings of molten thermoplastic adhesives can be employed for applying the adhesive composition in the present invention. For example, application techniques, such as extrusion, heated doctor blades, or passing the bottom surface of the tufted material in contact with the top surface of a rotating roller partially submerged in a tank of the molten adhesive, are suitable in the present invention. In general, the adhesive is applied in an amount equal to about 10–25 ounces per square yard of the tufted material which, incidentally, is generally lower than that required with latex formulations.

Also, the adhesive of the present invention is suitable for use on carpets when it is desirable to apply a secondary backing to the adhesively bonded tufted carpet. As previously emphasized, a particular advantage of the present adhesive is that the secondary backing can be applied without the necessity of drying the adhesive. Of course, if desired, the adhesive can be solidified prior to application of the secondary backing and subsequently reactivated by simply heating the exposed surface until it is in a molten state. Useful secondary backing materials are well known and include those used as primary backing materials.

The particular adhesive composition of the present invention contains the following three essential ingredients: an ethylene copolymer, a wax component, and a unique resin extender blend of a base resin and a modifying resin. As hereinafter set forth, the composition of the present invention consists essentially of the three named ingredients in particular proportions. However, other ingredients, which do not basically detract from the composition's adhesive characteristics, can also be included. In fact, a filler material is frequently present while ingredients, such as anti-oxidants, pigments, and plasticizers, among others, can also be included.

The ethylene copolymers discovered to be most useful in the present invention are ethylene copolymers with vinyl esters of lower carboxylic acids. Such ethylene/lower vinyl ester copolymers can be prepared by known techniques, such as illustrated in U. S. Pat. No. 2,200,429 to Perrin et al. and U. S. Pat. No. 2,703,794 to Roedel. While an ethylene/vinyl acetate copolymer is preferred, other ethylene copolymers, such as those of vinyl formate, vinyl propionate, and vinyl butyrate, are useful as well. Additionally, ethylene copolymers of lower acrylates and methacrylates, such as ethylene-isobutyl acrylate are also useful. The ethylene copolymers have melt indexes, as measured by ASTM 1238-52T, of about 1.2–35, preferably 1.6–20, with a polymerized ethylene content of about 60–35 weight percent and preferably 72–82 weight percent. Correspondingly, the polymerized ester content of useful ethylene copolymers is between about 40–15 weight percent, and preferably 28–18 weight percent. Additionally, ethylene copolymers containing minor amounts (i.e., up to about 3 weight percent) of other polymerizable comonomers, such as acrylic acid, methacrylic acid, itaconic acid, acrylamide, beta dimethylaminoethyl methacrylate, beta hydroxyethyl acrylate, diallyl maleate, diallyl phthalate, diallyl ether or ethylene glycol dimethacrylate, are useful as well.

Regarding the second essential ingredient in the present composition, i.e., the wax component, it is necessary that it have a melting point sufficiently high to give adhesive compositions with a softening point of greater than 190°F. Accordingly, the wax component can be either solely a Fischer-Tropsch wax or blends of high melting point petroleum waxes and low molecular weight polyolefin waxes wherein the polyolefin wax is at least 15 weight percent of the wax blend. The preferred high melting point petroleum waxes are those customarily known as microcrystalline waxes which have melting points in excess of about 160°F. or paraffin waxes having melting points in excess of 140°F. Preferred low molecular weight polyolefin waxes are polyethylene waxes having a molecular weight of less than about 5,000 and melting points of 220°F.–250°F.

The third essential ingredient in the present adhesive composition is a unique resin extender blend of a base resin and a modifying resin. It has been discovered that the use of this blend in an ethylene copolymer-wax composition produces an adhesive backsizing composition with extraordinarily high toughness. Useful base resins are aliphatic thermoplastic petroleum hydrocarbon resins such as described in Canadian Pat. No. 531,202 issued Oct. 2, 1956 to Ward. As therein set forth, the resins are prepared from reactive olefins and diene monomers having low carbon atom content (five-seven carbon atoms), and are substantially free of polymerized aromatics. Of the resins therein described, those having molecular weights of about 800–1,750, iodine numbers of about 40–66, and ring and ball softening points (ASTM D-36-26) of about 155°F.–240°F., and especially above 215°F., are preferred. Such useful base resins are available under Pennsylvania Industrial Chemical Corporation's trade name "Piccopale."

Modifying resins useful in the present invention are low molecular weight dicyclopentadiene alkylation polymers having ring and ball softening points of about 40°F.–105°F. Dicyclopentadiene alkylation polymers are described in U. S. Pat. No. 3,023,200 issued Feb. 27, 1962 to Epstein and Gangemi. As therein defined, the term "alkylation" refers to the formation of a carbon to carbon bond between an aromatic nucleus and a dicyclopentadiene nucleus. Also, this patent describes how dicyclopentadiene alkylation polymers can be prepared with desired softening points and molecular weights. Particularly useful modifying resins have specific gravities of about 0.90–1.1, melt viscosities of about 1 poise over the temperature range of about 175°F.–265°F., and softening points of about 65°F.–90°F.

To attain superior toughness, the weight ratio of base resin to modifying resin is about 0.3–4. At higher ratios the resulting adhesive composition is too brittle for use in carpeting applications. On the other hand, the use of lower weight ratios results in adhesive blends that are excessively soft.

The preferred ratio of base to modifying resin for a particular composition is selected so as to yield a finished carpet having an optimum hand. Where the composition does not contain a filler and low coating weights are used, high ratios, e.g., 1.3–2.5, are preferred. On the other hand, with filled compositions, a carpet with good hand can be prepared using an adhesive composition wherein the base to modifying resin ratio is 0.3–1. Furthermore, if the wax component of the adhesive is predominantly a hard wax, such as paraffin, good "hand" can be obtained at lower ratios than if a soft wax is used.

The proportional amounts of the three essential ingredients in the adhesive composition is important. In erally in a solid form, such as pellets, and filler are blended into the wax/resin mixture.

The following formulations illustrate filled adhesive compositions of the present invention with all parts and percentages being by weight unless otherwise indicated. Those weight percents in parentheses are based on the three essential ingredients, while the others are based on the total composition including filler and antioxidant.

| Formulation | A | | B | | C | | D | |
|---|---|---|---|---|---|---|---|---|
| Ethylene/vinyl acetate copolymer (75 wt. % Et/25 wt. % VAc-M.I. 2) | 15.0 | (21.5) | 10.0 | (16.7) | | | 10.0 | (14.3) |
| Ethylene/vinyl acetate copolymer (82 wt. % Et/18 wt. % VAc-M.I. 2.5) | | | | | 15.0 | (21.5) | | |
| Microcrystalline wax[1] | 10.2 | (14.6) | 8.4 | (14.1) | 9.3 | (13.3) | 11.1 | (15.9) |
| Polyethylene wax[2] | 1.8 | (2.6) | 1.6 | (2.7) | 1.7 | (2.5) | 2.0 | (3.0) |
| Modifying resin[3] | 25.6 | (36.7) | 30.0 | (50.0) | 32.8 | (47.0) | 27.9 | (39.9) |
| Base resin[4] | 17.2 | (24.6) | 9.8 | (16.5) | 11.0 | (15.7) | 18.8 | (26.9) |
| Calcium carbonate filler (average particle size 2.5 microns) | 30.0 | | 40.0 | | 30.0 | | 30.0 | |
| "Tenox" BHT antioxidant | 0.2 | | 0.2 | | 0.2 | | 0.2 | |

[1] "Multiwax" 180M—(Witco Chemical Company—M.P. 180°P.—Needle penetration of 10–20 at 77°F.)
[2] "Polyethylene AC-8"—(Allied Chemical Corp.—Average molecular weight 3500; M.P. 240°F.)
[3] "Piccovar" AP-25—(Pennsylvania Industrial Chemical Corp.'s dicyclopentadiene alkylation polymer; softening point 71°F.–83°F., specific gravity 0.97).
[4] "Piccopale" 110SF—(Pennsylvania Industrial Chemical Corp.; softening point 225°F.–235°F., specific gravity 0.97).

general, the ethylene copolymer is present in an amount of about 10–35 weight percent and preferably 12–25 weight percent, based on the total weight of the three ingredients. At lower copolymer contents, the adhesion and toughness characteristics of the blend are diminished while at higher copolymer contents the viscosity of the blend at application temperatures becomes too high. On the other hand, in order to avoid excessive brittleness, the wax ingredient is generally not present in amounts greater than about 25 weight percent. However, at least about 10 weight percent wax is necessary in order to impart a high softening temperature to the composition. Correspondingly, the resin extender blend content is generally from about 50–70 weight percent. The use of lower proportions of this ingredient tends to increase melt viscosity at application temperatures, while higher amounts diminish the adhesive's toughness. Preferably, the amount of resin extender blend and wax are about 60–70 and 15–20 weight percent, respectively.

Suitable fillers useful in the present composition are well known; examples of which include clay, talc, calcium, and magnesium silicates, calcium carbonate, wood flour, etc. While filled compositions generally cost less per pound, it is necessary that they be employed at coating weights of about 20–25 ounces per square yard. With unfilled compositions lower coating weights of 10–20 ounces are used. Filled compositions can be prepared with filler contents up to about 45 weight percent, based on the total composition, while amounts between about 30 and 40 percent are generally considered most desirable.

The particular manner in which the ingredients are added to formulate the composition of the present invention is not critical and can be accomplished by any of the well known techniques. In general, the wax is initially melted, usually in the presence of an antioxidant, and thereafter the resin extenders are uniformly blended in. Subsequently, the ethylene copolymer, gen- Formulations A-D have application viscosities within the aforementioned desirable range. Additionally, the toughness and softening point of the blend of the three essential components in the formulations are above 11,000 and 190°F., respectively. Furthermore, carpets backsized with these formulations display excellent pill resistance, secondary backing bond, and have good hand.

The following example, using the above Formulation D and a comparative formulation, illustrates the effect of the resin extender blend on strength properties of a filled composition.

EXAMPLE

Even pile nylon carpet (22–24 oz. of face yarn/yd[2]) with a jute primary backing was backsized with Formulation D at a coating weight of 18.8 oz/yard, a coating speed of 15 feet/min., and at a temperature of 275°F. The melt viscosity of the formulation was 6,100 centipoises, while the toughness and softening point of the copolymer, wax, resin blend was 83,000 and 194°–198°F., respectively. Subsequent to the adhesive application, and prior to solidification, a secondary jute backing was applied. A second carpet was also coated with Formulation D as above except that the application temperature was raised to 280°F. and the coating weight lowered to 16.4 oz/yd. Formulation melt viscosity was 5,500 centipoises.

For comparison, coating trials were also conducted using a formulation similar to Formulation D except that the weight percentages, based on the total formulation, of the modifying and base resin extenders were 9.4 and 37.3, respectively. In this comparative formulation the toughness of the copolymer, wax, resin blend was 9,200 and the softening point 206°–208°F. Two carpets were prepared, as above described, using the comparative formulation; the first at an application temperature of 275°F. (melt viscosity of 14,000 centipoises) and a coating weight of 17.8 oz/yd. and the second at an application temperature of 300°F. (melt viscosity of 8,000 centipoises) and a coating weight to 16.9 oz/yd.

The Formulation D carpet samples and the comparative samples were tested for pill resistance and secondary backing bond as previously described with the following results:

|  | Formulation D | | Comparative Formulation | |
|---|---|---|---|---|
|  | 18.8 oz/yd 275°F. | 16.4 oz/yd 280°F. | 17.8 oz/yd 275°F. | 16.9 oz/yd 300°F. |
| Pill Resistance- | 5.0 | 5.0 | 5.0 | 2.0 |
| Secondary Backing Bond (lb/3") | 11.3 | 12.2 | 4.2 | 7.2 |

The following formulations illustrate unfilled adhesive compositions of the present invention. Again, all parts and percentages are by weight unless otherwise indicated.

| Formulation | E | F | G |
|---|---|---|---|
| Ethylene/vinyl acetate copolymer (75 wt. % Et/25 wt. % VAc-M.I. 2) | 21.4 | 21.4 | 21.4 |
| Paraffin wax[1] | 14.6 | 14.6 |  |
| Microcrystalline wax[2] |  |  | 14.6 |
| Polyethylene wax[3] | 2.6 | 2.6 | 2.6 |
| Modifying resin[4] | 36.6 | 24.6 | 24.6 |
| Base resin[5] | 24.6 | 36.6 | 36.6 |
| "Tenox" BHT antioxidant | 0.2 | 0.2 | 0.2 |
| Elastic modulus (p.s.i.) | 7,790 | 16,640 | 8,410 |

[1] Sinclair 153 wax (melting point of 153°F.)
[2] Shell MX Wax 170 (melting range 172-180°F.)
[3] "Polyethylene AC-8" — (Allied Chemical Corp. — Average molecular weight 3500; M.P. 240°F.)
[4] "Piccovar" AP-25 — (Pennsylvania Industrial Chemical Corp.'s dicyclopentadiene alkylation polymer; softening point 71°F.-83°F., specific gravity 0.97).
[5] "Piccopale" 110SP — (Pennsylvania Industrial Chemical Corp.; softening point 225°F.-235°F., specific gravity 0.97).

As with the filled formulations, Formulations E-G are very good backsizing adhesives with respect to application viscosity, adhesive strength, and softening point. Carpets prepared with these compositions have good hand at low coating weights; with Formulation F being particularly outstanding in this respect. A nylon carpet (19 oz/yd$^2$, pile height of 15/32 inch, and 8.0 stitches per inch) backsized with Formulation F at a coating weight of 13.6 oz/yd.$^2$ had a pill resistance of 4.8 and a secondary backing bond of 13.1 lbs/3 inches.

I claim:

1. A carpet comprised of a primary backing material stitched with closely spaced erect loops of yarn to form a tufted structure, the bottom surface of the tufted structure having, as an adhesive coating, a composition having a softening point of at least 190°F. comprising (A) about 10-35 weight percent ethylene copolymer having a melt index of about 1.2-35 and comprising about 60-85 weight percent copolymerized ethylene and about 15-40 weight percent copolymerized vinyl ester wherein the acid moiety contains one-four carbon atoms, acrylate, or methacrylate wherein the alcohol moiety contains one-four carbon atoms, (B) about 10-25 weight percent wax having a melting point sufficiently high to yield compositions with a softening point of at least 190°F., and (C) about 50-70 weight percent resin blend of (a) an aliphatic thermoplastic hydrocarbon resin substantially free of polymerized aromatics prepared from diene and olefin monomers of five to seven carbon atoms and having a softening point of about 155°F.-240°F. and (b) a polymer resin derived from the alkylation of aromatic compounds with dicyclopentadiene and having a softening point of about 40°F.-105°F.; the weight percentages of (A), (B), and (C) being based on the combined weight of these three ingredients and the weight ratio of (a) to (b) being about 0.3-4.

2. A carpet comprised of a primary backing material stitched with closely spaced erect loops of yarn to form a tufted structure, the bottom surface of the tufted structure having, as an adhesive coating, the composition of claim 1 wherein filler is present in an amount of 30-40 weight percent.

3. A carpet comprised of a primary backing material stitched with closely spaced erect loops of yarn to form a tufted structure, the bottom surface of the tufted structure having, as an adhesive coating, the composition of claim 1 wherein (A), (B), and (C) add up to substantially 100 percent and are present in weight percentages of about 12-25 percent, 15-20 percent, and 60-70 percent, respectively, and wherein the ethylene copolymer is an ethylene/vinyl acetate copolymer having a melt index of 1.6-20 and a copolymerized ethylene and vinyl acetate content of 72-82 weight percent and 28-18 weight percent, respectively, and wherein resin (a) has a softening point of 215°F.-240°F. and resin (b) has a softening point of 65°F.-90°F., and a major portion of (B) is a paraffin wax.

* * * * *